United States Patent [19]
Glab et al.

[11] Patent Number: 5,649,450
[45] Date of Patent: Jul. 22, 1997

[54] ALARM ASSEMBLY FOR PRODUCT LEVEL GAUGE

[75] Inventors: Charles Duncan Glab; Michael Donald Lattner, both of Dubuque, Iowa

[73] Assignee: Morrison Bros. Co., Dubuque, Iowa

[21] Appl. No.: 296,705

[22] Filed: Aug. 26, 1994

[51] Int. Cl.$^6$ ............................................. G02F 23/30
[52] U.S. Cl. ................................... 73/307; 73/321
[58] Field of Search .............................. 73/305, 306, 307, 73/309, 314, 319, 320, 321; 340/623, 624

[56] References Cited

U.S. PATENT DOCUMENTS

| | | | |
|---|---|---|---|
| 219,702 | 9/1879 | Eckhoff . | |
| 480,309 | 8/1892 | Willan | 73/307 |
| 939,763 | 11/1909 | Vaage | 73/307 |
| 1,225,178 | 5/1917 | Rogers . | |
| 1,264,115 | 4/1918 | Moore | 73/307 |
| 2,600,341 | 6/1952 | Thompson | 73/313 |
| 2,713,794 | 7/1955 | Burns | 73/321 |
| 2,949,777 | 8/1960 | Ferron | 73/321 |
| 3,009,158 | 7/1961 | Barker | 73/321 |
| 3,148,542 | 9/1964 | Clift | 73/308 |
| 3,482,447 | 12/1969 | Bennett | 73/321 |
| 4,244,219 | 1/1981 | Takahashi | 73/321 X |
| 4,255,859 | 3/1981 | Klieman | 73/321 X |
| 4,459,584 | 7/1984 | Clarkson | 73/321 X |
| 4,571,998 | 2/1986 | Stenger | 73/321 |
| 4,821,022 | 4/1989 | Jannotta | 73/307 X |
| 4,942,351 | 7/1990 | Kronau | 73/321 X |
| 4,988,978 | 1/1991 | Soto | 73/321 X |
| 5,144,836 | 9/1992 | Webb | 73/319 |
| 5,533,392 | 7/1996 | Kira | 73/321 X |

FOREIGN PATENT DOCUMENTS

882087 11/1961 United Kingdom .
1105118 12/1965 United Kingdom .

*Primary Examiner*—Richard Chilcot
*Assistant Examiner*—Elizabeth L. Dougherty
*Attorney, Agent, or Firm*—Woodcock Washburn Kurtz Mackiewicz & Norris LLP

[57] ABSTRACT

A gauge assembly for measuring the level of a liquid product in a storage tank includes a float member that is constructed and arranged to float on the liquid product in the storage tank, a housing that is constructed and arranged to be mounted on an exterior of the storage tank and a drum that is mounted inside the housing for rotation about an axis. A filament is wound about the drum, and extends through an opening defined in the housing to an attachment with a float member. A spring is provided for biasing the drum in a first rotary direction that will wind the filament onto the drum, whereby the drum will tend to pull the float member toward the housing, keeping the filament taut. A clock-type face is mounted on the housing, and has distance indicia marked there around that is in a base-twelve numbering system to represent feet and inches, rather than hours and minutes. A small hand is mounted to traverse the clock face to represent feet, and is connected to the drum via a gear train. A large hand is mounted to traverse the clock face to represent inches, and is also connected to the gear train. A novel alarm system for indicating when the storage tank is filled to a predetermined maximum level includes an alarm indicator mounted on the clock face to indicate a level of the float member at which the alarm will sound. The alarm indicator is ordinarily connected to the gear train, but may be adjusted with respect to the gear train, whereby a user will be able to manually adjust the level at which the alarm system will be actuated to correspond to a selected level in the storage tank.

16 Claims, 6 Drawing Sheets

ALARM ASSEMBLY FOR PRODUCT LEVEL GAUGE

BACKGROUND OF THE INVENTION

1. Field of the Invention

This invention relates to a gauge assembly for monitoring the level of a liquid product in a storage tank or similar container, and to a convenient, user-friendly and reliable adjustable alarm for such a gauge assembly.

2. Description of the Prior Art

A great variety of devices have been used to monitor liquid product level in storage tanks and similar vessels. However, monitoring product level in storage tanks which contain petroleum products or other volatile liquids presents special requirements that have not been fully satisfied by the technology in common use today.

One device that has been used to monitor product level in such facilities is disclosed in U.S. Pat. No. 5,144,836 to Webb, the disclosure of which is hereby incorporated into this document. The Webb gauge utilizes a clock-type face that represents liquid product level in feet and inches, rather than in hours and minutes. The gauge further includes a float member that is intended during operation to be suspended near the surface of the product contained within the storage tank. A filament, kept taut by spring biasing, is attached to the float to sense the level of the float.

While a product level gauge such as that disclosed in the Webb patent can accurately indicate the level of product within the tank, it does not provide active protection against an overfill condition while the tank is being filled. Often, an operator is too busy to watch the gauge during filling of the tank.

It is clear that a long and unfilled need has existed in the prior art for an improved gauge assembly for monitoring the level of a liquid product that is capable of warning an operator of a potential overfill situation before it occurs.

SUMMARY OF THE INVENTION

Accordingly, it is an object of the invention to provide an improved gauge assembly for measuring the level of a liquid product in a storage tank that is capable of warning an operator of a potential overfill situation before it occurs.

It is further an object of the invention to provide such a gauge assembly, wherein the mechanism for warning an operator of a potential overfill situation is readily adjustable to different sizes of storage tanks and operator preferences.

It is further an object of the invention to provide such a gauge assembly, wherein the mechanism for warning an operator of a potential overfill condition is reliable, will not be affected by exposure to petroleum products, and is intrinsically safe from risk of fire or explosion in the event of exposure to a flammable product.

In order to achieve the above and the other objects of the invention, a gauge assembly for measuring the level of a liquid product in a storage tank includes, according to a first aspect of the invention, a float member that is constructed and arranged to float on the liquid product in the storage tank; a housing that is constructed and arranged to be mounted on an exterior of the storage tank; a drum mounted inside the housing for rotation about an axis; a filament wound about the drum, the filament extending through an opening defined in the housing and having a distal end that is secured to the float member; a biasing mechanism for biasing the drum in a first rotary direction that will wind the filament onto the drum, whereby the biasing mechanism will tend to pull the float member toward the housing, thereby keeping the filament taut; a clock-type face mounted on the housing, the clock-type face having distance indicia marked therearound that is in a base-twelve numbering system to represent feet and inches rather than hours and minutes; a small hand mounted to traverse the clock-face to represent feet, the small hand being connected to the drum via a gear train; a large hand mounted to traverse the clock face to represent inches, the large hand being connected to the gear train; an alarm system for indicating an alarm condition; an alarm indicator mounted on the clock face to indicate a level of the float member at which the alarm system will sound, the alarm indicator being connected to the gear train; and an alarm adjustment mechanism for manually adjusting the position of the alarm indicator with respect to the gear train, whereby a user will be able to manually adjust the level at which the alarm system will be actuated to correspond to a selective level in the storage tank.

According to a second aspect of the invention, in a gauge assembly for measuring the level of a liquid product in a storage tank that includes a float member that is constructed and arranged to float on the liquid product in the storage tank; a housing that is constructed and arranged to be mounted on an exterior of the storage tank; a drum mounted inside the housing for rotation about an axis, a filament wound about the drum; the filament extending through an opening defined in the housing and having a distal end that is secured to the float member; a biasing system for biasing the drum in a first rotary direction that will wind the filament onto the drum, whereby the biasing system will tend to pull the float member toward the housing, thereby keeping the filament taut; a clock-type face mounted on the housing, the clock-type face having distance indicia marked therearound that is in a base-twelve numbering system to represent feet and inches rather than hours and minutes; a small hand mounted to traverse the clock face to represent feet, the small hand being connected to the drum via a gear train; a large hand mounted to traverse the clock face to represent inches, the large hand being connected to the gear train; an alarm system for indicating an alarm condition; an alarm indicator mounted on the clock face to indicate a level of a float member at which the alarm system will sound, the alarm indicator being connected to the gear train via a pinion that is mounted to rotate with the alarm indicator; and a spring for axially biasing the pinion into engagement with the gear train, a method including steps of: (a) pulling the alarm indicator against the biasing of the spring to disengage the pinion from the gear train; (b) rotating the alarm indicator and, thus, the pinion by a desired amount whereby the alarm indicator is positioned in a desired orientation; and (c) releasing the alarm indicator to re-engage the pinion with the gear train in the desired orientation, whereby the alarm indicator is adjusted to a position that corresponds to an elevation of the float member at which the alarm will be actuated. These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
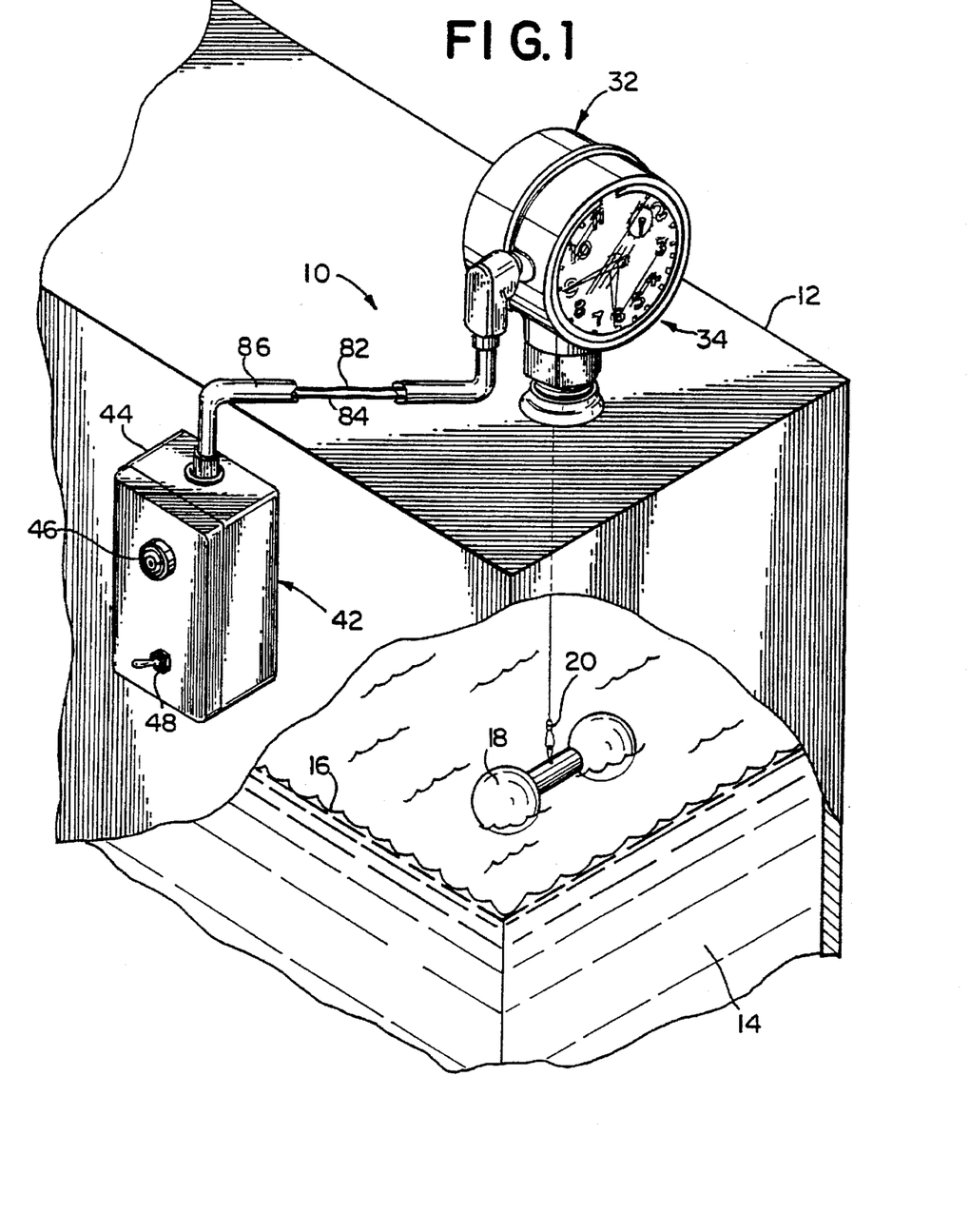
FIG. 1 is a fragmentary perspective view of a storage tank and gauge assembly that is constructing according to a preferred embodiment of the invention.

Referring now to the drawings, wherein like references numerals designate corresponding structure throughout the views, and referring in particular to FIG. 1, a gauge assembly 10 for a storage tank 12 of the type that is adapted to be filled with a liquid product 14, such as a petroleum product, monitors a fill level 16 by utilizing a float member 18 that is constructed and arranged to float on an upper surface of the liquid product 14. As may be seen in FIG. 1, gauge assembly 10 includes a filament 22 having a distal end 20 that is connected to float member 18, preferably by a clip mechanism 80, as may be seen in FIGS. 3 and 7.

Figure 4:
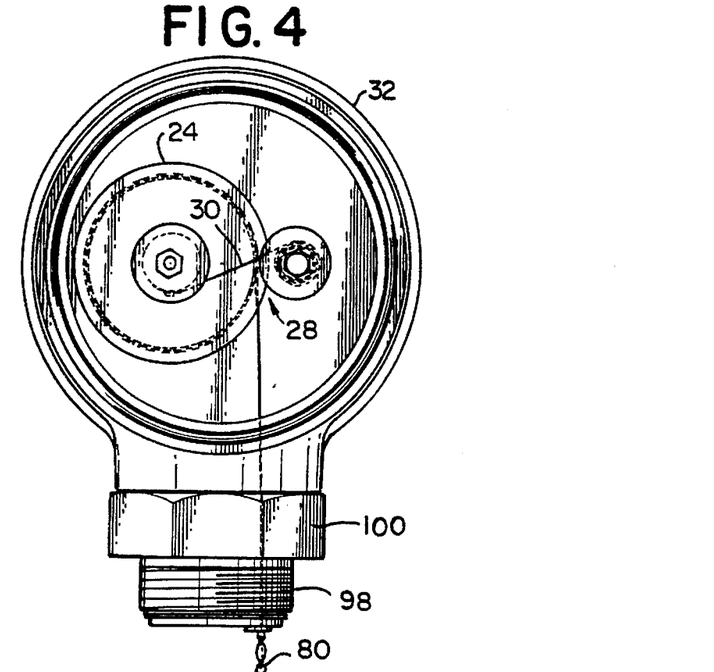
FIG. 4 is a cross-sectional view taken on lines 4—4 in FIG. 3.
Figure 7:
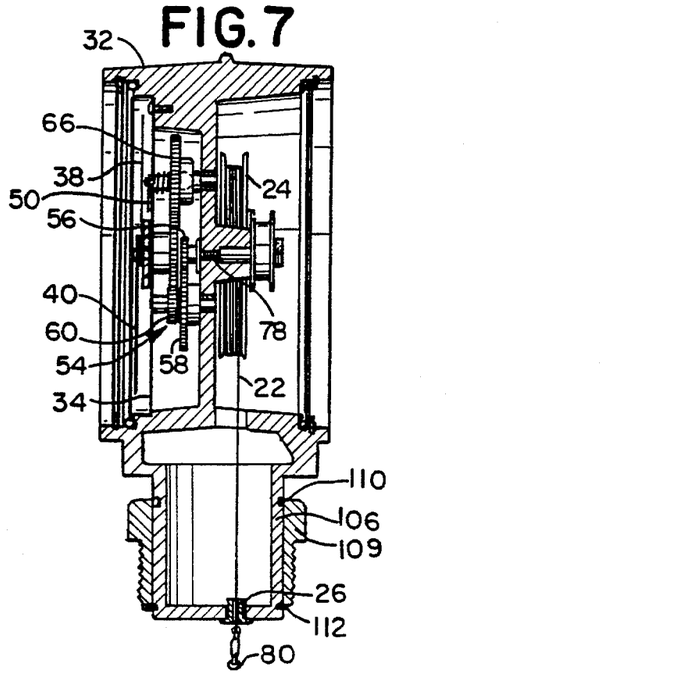
FIG. 7 is a cross-sectional view taken along lines 7—7 in FIG. 2.

Referring now to FIGS. 4 and 7, it will be seen that filament 22 passes through an opening 26 that is defined in a housing 32 of gauge assembly 10. Filament 22 is wound about a drum 24 that is mounted for rotation within the housing 32, as is shown in both FIGS. 4 and 7. A biasing mechanism 28 is provided for biasing the drum 24 in a first rotary direction that will wind the filament 22 onto drum 24, so that biasing mechanism 28 will tend to pull float member 18 toward housing 32, thereby keeping filament 22 taut for purposes of accuracy. Preferably, biasing mechanism 28 includes a constant force spring 30 as is best shown in FIG. 4.

Figure 2:
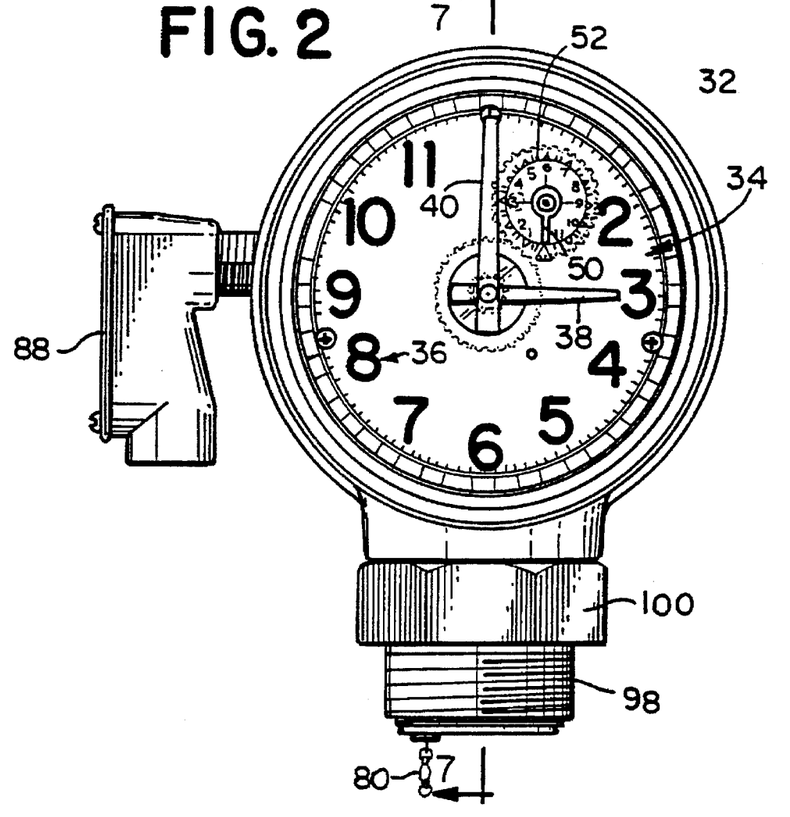
FIG. 2 is a front elevational view of the gauge assembly that is depicted in FIG. 1.

Looking now to FIGS. 1 and 2, it will be seen that gauge assembly 10 preferably includes a clock-type face having distance indicia 36 marked therearound that is in a base-twelve numbering system to represent feet and inches, rather than hours and minutes. A small hand 38 is mounted to traverse clock face 34 to represent feet, and a large hand is also mounted to traverse clock face 34 to represent inches. Both small and large hands 38, 40 are mechanically connected to drum 24 via a gear train 54, which will be described in greater detailed below.

Referring again to FIG. 1, it will be seen that gauge assembly 10 further includes an alarm assembly 42 having an alarm box 44 that is mounted externally of housing 32, and is preferably mounted on a side of storage tank 12, as is shown in FIG. 1. As shown in FIG. 1, alarm box 44 includes an alarm horn 46 and a switch 48 that is provided with off, on and test positions. Looking now to FIGS. 2 and 3, it will be seen that alarm assembly 42 further includes an alarm indicator 50 that is provided to traverse clock face 34. Alarm indicia 52 are printed on clock face 34 as best shown in FIG. 2.

Figure 5:
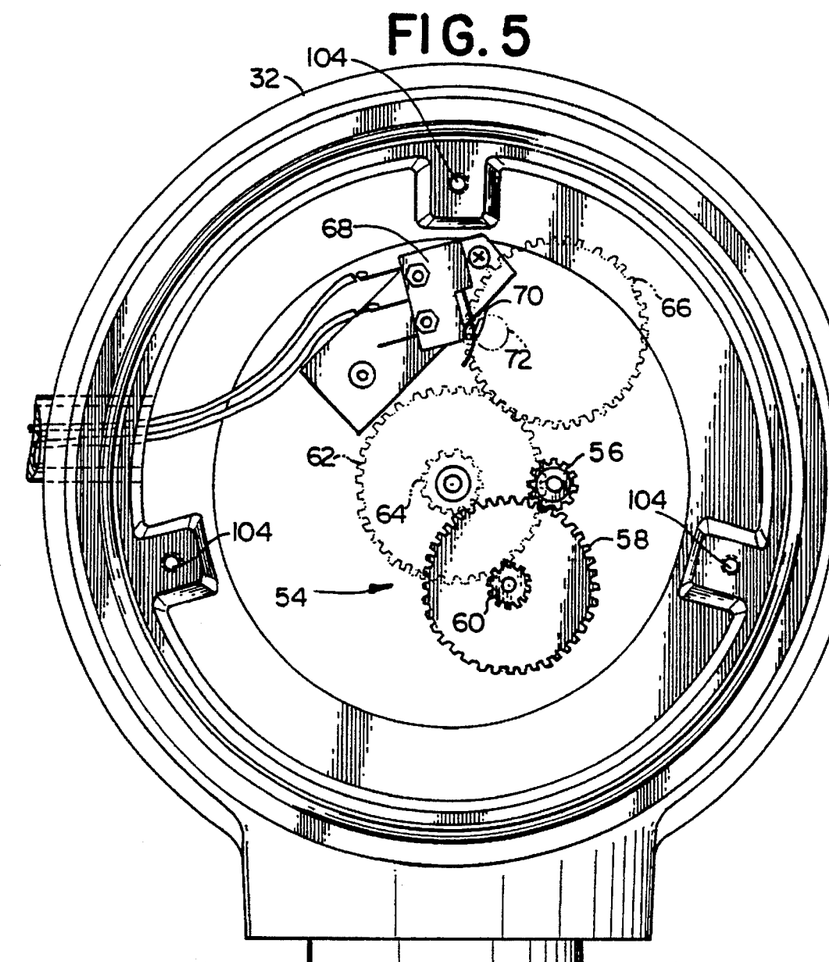
FIG. 5 is a cross-sectional view taken along lines 5—5 in FIG. 3.
Figure 6:
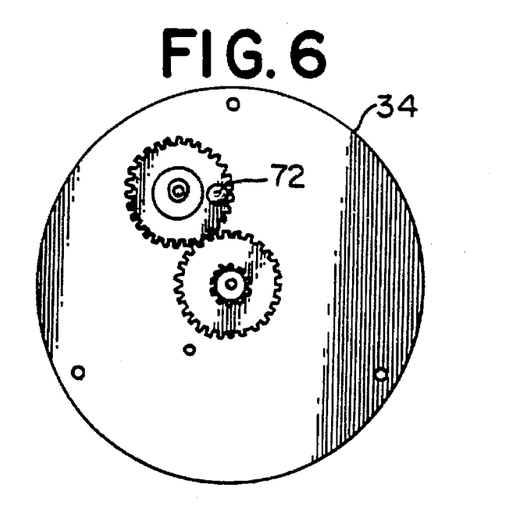
FIG. 6 is a cross-sectional view taken along lines 6—6 in FIG. 3.

As may be seen best in FIGS. 5–7, gear train 54 includes a first pinion 56 that is mechanically connected to drum 24 to rotate with drum 24. As may best be seen in FIG. 5, a second pinion 58 is positioned to be driven by first pinion 56. A third pinion 60 that is smaller than second pinion 58 is mounted coaxially with second pinion 58 to rotate with second pinion 58. A fourth pinion 62 is connected to rotate with small hand 38 on clock face 34. A fifth pinion 64 is connected to rotate with large hand 40 on clock face Fourth pinion 62 is larger than fifth pinion 64, and is engaged to be driven by third pinion 60. Fifth pinion 64 is engaged to be driven by second pinion 58. The different reduction ratios provided by third pinion 60 and fourth pinion 62, and second pinion 58 and fifth pinion 64, respectively, will ensure that large hand 40 will circumferentially traverse clock face 34 twelve times for each time that small hand 38 circumferentially traverses clock face 34.

Looking now to FIGS. 5 and 6, it will be seen that a sixth pinion 66 is arranged to be driven by gear train 54, and, more specifically, by the fourth pinion 62. Alarm assembly 42 further includes a cam element 72 mounted on sixth pinion 66, as may be seen in FIGS. 5 and 6. An electrical switch 68 is mounted on housing 32 and includes a leaf type contact 70 which, when depressed, will close switch 68 and electrically connect a pair of wires 82, 84 leading to alarm box 44. Alarm box 44 contains conventional circuitry, which, when actuated by moving the off/on switch to the on position will emit a series of sharp, pulsed noises upon the closing of electrical switch 68.

Figure 8:
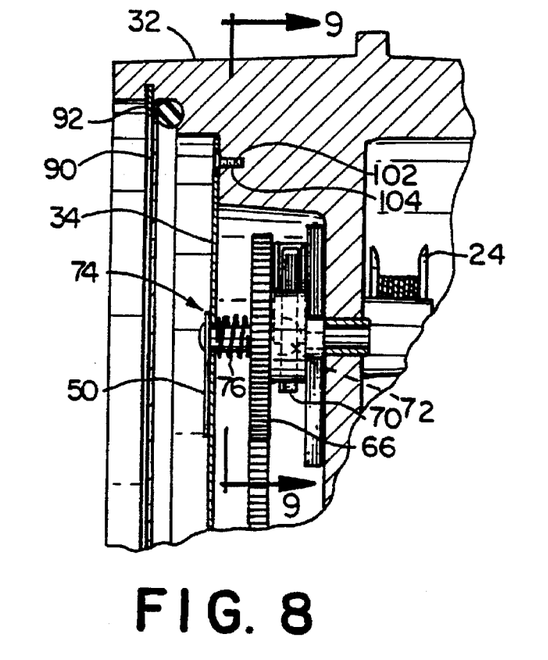
FIG. 8 is a fragmentary view of a portion of the mechanism that is depicted in FIG. 7, magnified for purposes of clarity.
Figure 9:
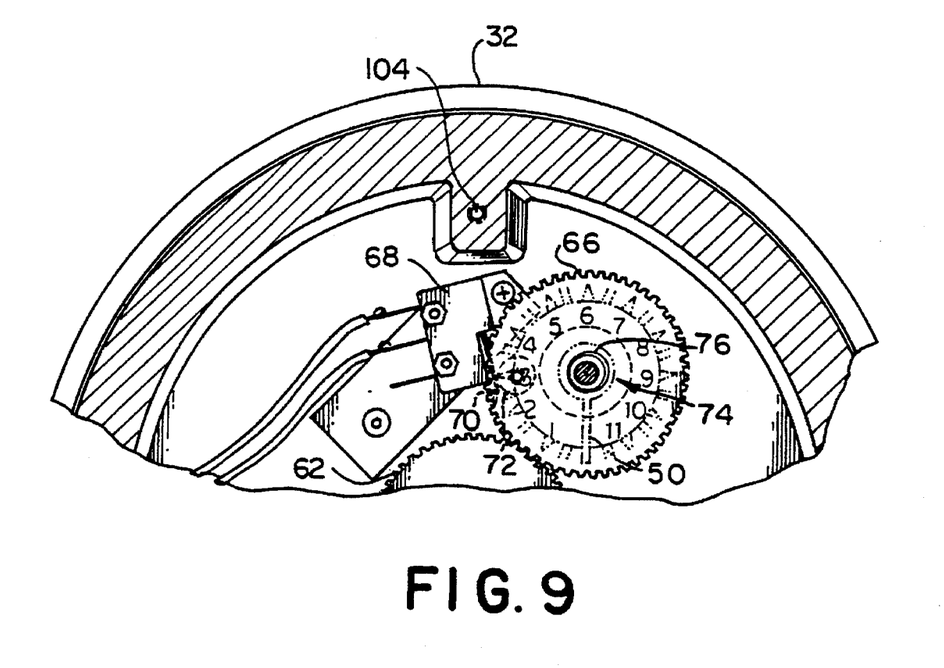
FIG. 9 is a diagrammatical view depicting aspects of the gauge assembly that is illustrated in FIGS. 1–8.

One novel aspect of gauge assembly 10 is the provision of a novel alarm adjustment mechanism 74, which is best depicted in FIG. 8. Alarm adjustment mechanism 74 includes sixth pinion 66, as well as a compression spring 76 that is positioned to axially bias sixth pinion 66 into the position shown in FIG. 8, that is, into a meshing engagement with fourth pinion 62. However, an operator may disengage sixth pinion 66 from fourth pinion 62 by pulling alarm indicator 50 outwardly from clock face 34, as will be explained in greater detail below.

As may be seen in FIG. 1, a protective conduit 86 is provided to house wires 82, 84 between the housing 32 of gauge assembly 10 and alarm box 34. A fitting 88 is provided on housing 32 for mating with the protective conduit 86. Accordingly, fitting 88 and protective conduit 86 protect wires 82, 84 from external interference, which is important in an outdoor facility.

Figure 3:
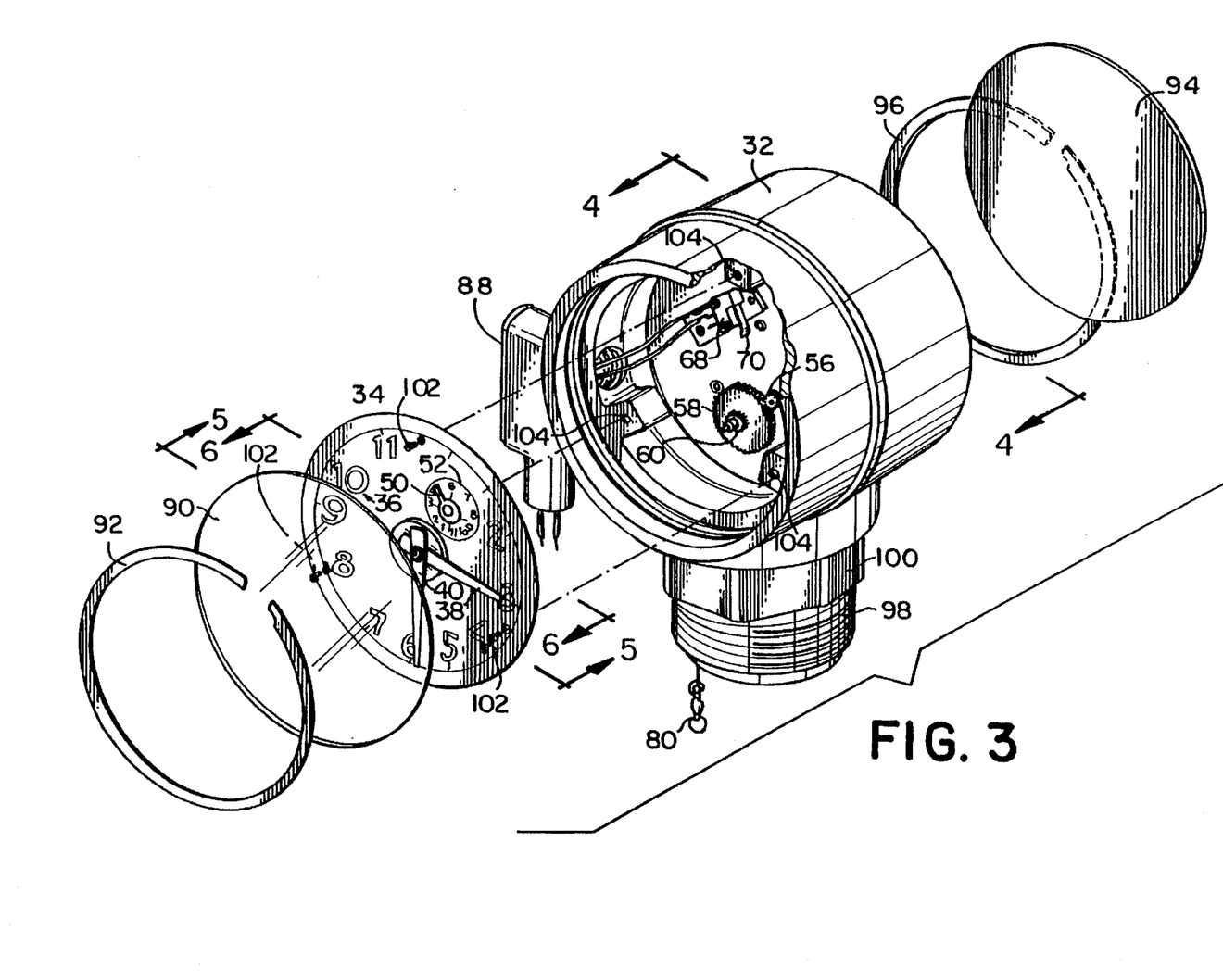
FIG. 3 is an exploded perspective view of the gauge assembly that is depicted in FIGS. 1 and 2.

Looking briefly to FIG. 3, it will be seen that a transparent face plate 90 is attached to housing 32 over clock-type face 34 during operation. Face plate 90 is held into place by a locking ring 92, also shown in FIG. 3. Similarly, a rear face plate 94, which is preferably not transparent, is mounted to a rear portion of housing 32 by means of a locking ring 96. Housing 32 includes a threaded mounting portion 98 for connection to storage tank 12, as well as a hexagonal gripping portion 100 that is used during installation and removal of gauge assembly 10 from storage tank 12. As shown in FIG. 7, threaded mounting portion 98 is embodied as a spout end 106, which is cylindrical and unitary with housing 32, and a swivel adapter 109 that is fitted thereabout so as to be able to swivel about spout end 106. An O-ring 110 is provided for sealing between spout end 106 and swivel adapter 109. A retaining ring 112 is provided to retain adapter 109 on spout end 106. This arrangement permits the gauge to be conveniently swivel-oriented during installation and operation.

A number of bolts 102 are used to secure clock-type face 34 to housing 32 during operation. Bolts 102 are received within mounting holes 104 that are provided in housing 32.

Figure 10:
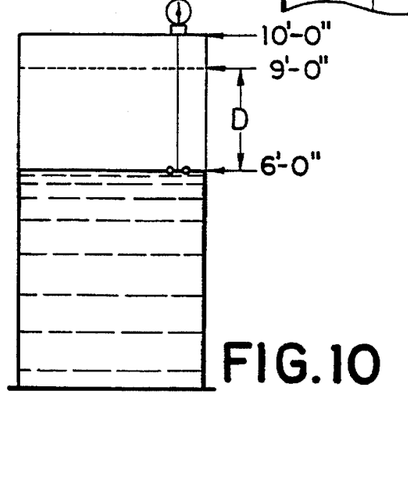
FIG. 10 is a diagrammatical view depicting how the gauge assembly shown in FIGS. 1–9 is adjusted.

In operation, gauge assembly 10 is installed onto storage tank 12 by attaching float member 18 to the distal end 20 of filament 22, dropping float member 18 into storage tank 12 through a threaded opening, and screwing the threaded mounting portion 98 of housing 32 into the threaded opening to secure gauge assembly 10 to the storage tank 12. The alarm box 44 is then secured to an appropriate surface of the storage tank 12 or an external control panel. At this point, it becomes necessary to set the alarm mechanism 74 to be actuated at the desired, predetermined fill level 16. This can be done in one of two ways. A first way, depicted in FIG. 10, involves removing the transparent face plate 90 from housing 32 to expose clock face 34, calculating the difference between the present fill level 16 in the product tank 12 and the predetermined level at which alarm actuation is desired, and resetting alarm indicator 50 to the calculated difference, as represented by the alarm indicia. For example, as shown in FIG. 10, if the present fill level is at six feet, zero inches, and the level at which alarm actuation is desired is nine feet, zero inches, the difference D would be three feet, zero inches. To set the alarm, an operator would pull alarm indicator 50 outwardly from clock face 34 against the biasing of compression spring 76, to disengage sixth pinion 66 from fourth pinion 62, rotate the alarm indicator 50 from the position shown in FIG. 2 in a clockwise direction until the alarm indicator is pointing toward the number "3", and release the alarm indicator so that, under the biasing of compression spring 76, sixth pinion 66 will reengage with fourth pinion 62 at the desired orientation. Transparent face plate 90 is then reinstalled onto housing 32. Should the fill level 16 within storage tank 12 rise to the alarm position, cam element 72 on sixth pinion 66 will rotate to the position shown in FIG. 5, thereby depressing the leaf type contact 70 on electrical switch 68 and actuating the alarm.

Figure 11:
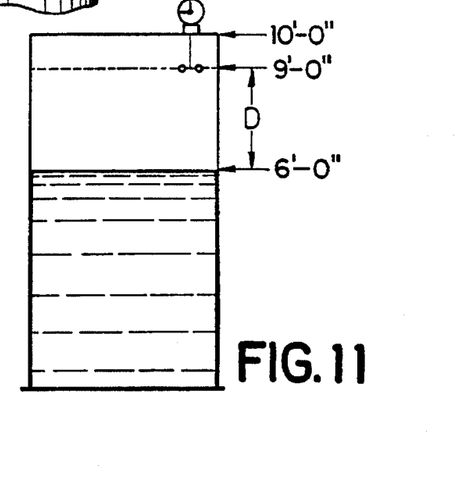
FIG. 11 is a diagrammatical view depicting an alternative adjustment method to that which is illustrated in FIG. 10.

An alternative method for setting the alarm assembly 74 is depicted in FIG. 11. According to this method, both the front and rear face plates 90, 94 are removed from housing 32, and drum 24 is manually wound until float member 18 is retracted to the position within storage tank 12 at which alarm actuation is desired. In the example given in FIG. 11, float member 18 is thus retracted to the level of nine feet, zero inches, where the present fill level is six feet, zero inches. At this point, the alarm indicator 50 is manually repositioned, according to the same method discussed above, to the alarm actuation value on clock face 34 or the "zero" position at the bottom of the alarm indicia 52. Once alarm indicator 50 is thus repositioned, the operator will released drum 24, allowing a float member 18 to drop into the product tank, and will replace face plates 90, 94 to their operative positions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A gauge assembly for measuring the level of a liquid product in a storage tank, comprising:

a float member that is constructed and arranged to be suspended at a predetermined level relative to a surface of the liquid product in the storage tank;

a housing that is constructed and arranged to be mounted on an exterior of the storage tank;

a drum mounted inside said housing for rotation about an axis;

a filament wound about said drum, said filament extending through an opening defined in said housing and having a distal end that is secured to said float member;

biasing means for biasing said drum in a first rotary direction that will wind said filament onto said drum, whereby said biasing means will tend to pull said float member toward said housing, thereby keeping said filament taut;

a clock-type face mounted on said housing, said clock-type face having distance indicia marked there around that is in a base-twelve numbering system to represent feet and inches, rather than hours and minutes;

a small hand mounted to traverse said clock face to represent feet, said small hand being connected to said drum via a gear train;

a large hand mounted to traverse said clock face to represent inches, said large hand being connected to said gear train;

an alarm means for indicating an alarm condition;

an alarm indicator mounted on said clock face to indicate a level of said float member at which said alarm means will sound, said alarm indicator being connected to said gear train; and alarm adjustment means for manually adjusting the position of said alarm indicator with respect to said gear train, whereby a user will be able to manually adjust the level at which said alarm means will be actuated to correspond to a selected level in the storage tank.

2. A gauge assembly according to claim 1, wherein said alarm adjustment means comprises a pinion that is mounted to rotate with said alarm indicator; and spring means for axially biasing said pinion into engagement with said gear train, whereby a user is able to adjust the position of said alarm indicator with respect to said gear train by pulling said alarm indicator against the biasing of said spring means to disengage said pinion from said gear train, rotating said alarm indicator and, thus, said pinion by a desired amount, and releasing said alarm indicator to reengage said pinion with said gear train in a desired orientation.

3. A gauge assembly according to claim 2, wherein said alarm means comprises an electrical switch that is positioned within said housing, and said pinion has a cam element mounted thereon for actuating said switch when said alarm indicator and, thus, said pinion is in a predetermined rotary position.

4. A gauge assembly according to claim 1, wherein said alarm means comprises intrinsically safe electronic circuitry.

5. A gauge assembly according to claim 1, wherein said alarm indicator is mounted to traverse a different, non-coaxial area of said clock-type face from said large hand and said small hand.

6. A gauge assembly according to claim 5, further comprising indicia provided on said clock-type face adjacent to said alarm indicator for indicating the level of said float member relative to the level at which said alarm means will be actuated.

7. A gauge assembly according to claim 1, wherein said alarm means comprises an audible alarm unit that is positioned at a location that is remote from said housing.

8. A gauge assembly according to claim 7, wherein said audible alarm unit is communicated with said housing by means of a protective conduit, and said housing has a fitting mounted thereto for receiving said protective conduit.

9. A gauge assembly according to claim 1, further comprising a transparent face plate that is removably mounted to said housing adjacent to said clock-type face, whereby a user can gain access to said alarm indicator by removing said face plate.

10. In a gauge assembly for measuring the level of a liquid product in a storage tank that includes a float member that is constructed and arranged to float on the liquid product in the storage tank; a housing that is constructed and arranged to be mounted on an exterior of the storage tank; a drum mounted inside said housing for rotation about an axis; a filament wound about said drum, said filament extending through an opening defined in said housing and having a distal end that is secured to said float member; biasing means for biasing said drum in a first rotary direction that will wind said filament onto said drum, whereby said biasing means will tend to pull said float member toward said housing, thereby keeping said filament taut; a clock-type face mounted on said housing, said clock-type face having distance indicia marked there around that is in a base-twelve numbering system to represent feet and inches, rather than hours and minutes; a small hand mounted to traverse said clock face to represent feet, said small hand being connected to said drum via a gear train; a large hand mounted to traverse said clock face to represent inches, said large hand being connected to said gear train; an alarm means for indicating an alarm condition; an alarm indicator mounted on said clock face to indicate a level of said float member at which said alarm means will sound, said alarm indicator being connected to said gear train via a pinion that is mounted to rotate with said alarm indicator; and spring means for axially biasing said pinion into engagement with said gear train, a method comprising steps of:

(a) pulling said alarm indicator against the biasing of said spring means to disengage said pinion from said gear train;

(b) rotating said alarm indicator and, thus, said pinion by a desired amount whereby said alarm indicator is positioned in a desired orientation; and (c) releasing said alarm indicator to reengage said pinion with said gear train in said desired orientation, whereby said alarm indicator is adjusted to a position that corresponds to an elevation of said float member at which said alarm will be actuated.

11. A method according to claim 10, further comprising a step of removing a face plate of said housing prior to step (a) to gain access to said alarm indicator.

12. A method according to claim 10, further comprising a step of positioning, prior to step (a), said float member to a the level at which said alarm means is intended to be actuated; and wherein step (b) comprises rotating said alarm indicator to a position on said clock-type face that corresponds to actuation of said alarm means.

13. A method according to claim 10, wherein said clock face has indicia provided on said clock-type face adjacent to said alarm indicator for indicating the level of said float member relative to the level at which said alarm means will be actuated, further comprising steps of, prior to step (b) positioning said float member to a position within said storage tank that represents a reference product level; calculating the difference in height between said reference product level and a level at which actuation of said alarm means is desired; and wherein step (b) comprises rotating said alarm indicator to a position on said clock-type face that is indicated by said indicia to be representative of said difference in height.

14. A method according to claim 13, wherein said reference product level is an actual product level in the storage tank at the time said method is performed.

15. A gauge assembly for measuring the level of a liquid product in a storage tank, comprising:

a float member that is constructed and arranged to be suspended at a predetermined level relative to a surface of the liquid product in the storage tank;

a housing that is constructed and arranged to be mounted on an exterior of the storage tank;

paying means for paying out a filament under tension;

a clock-type face mounted on said housing, said clock-type face having distance indicia marked there around that is in a base-twelve numbering system to represent feet and inches, rather than hours and minutes;

a small hand mounted to traverse said clock face to represent feet, said small hand being connected to said paying means via a gear train;

a large hand mounted to traverse said clock face to represent inches, said large hand being connected to said gear train;

an alarm means for indicating an alarm condition;

an alarm indicator mounted on said clock face to indicate a level of said float member at which said alarm means will sound, said alarm indicator being connected to said gear train; and alarm adjustment means for manually adjusting the position of said alarm indicator with respect to said gear train, whereby a user will be able to manually adjust the level at which said alarm means will be actuated to correspond to a selected level in the storage tank.

16. A gauge assembly for measuring the level of a liquid product in a storage tank, comprising:

a float member that is constructed and arranged to be suspended at a predetermined level relative to a surface of the liquid product in the storage tank;

a housing;

paying means for paying out a filament under tension;

a clock-type face mounted on said housing, said clock-type face having distance indicia marked there around that is in a base-twelve numbering system to represent feet and inches, rather than hours and minutes;

a small hand mounted to traverse said clock face to represent feet, said small hand being connected to said paying means via a gear train;

a large hand mounted to traverse said clock face to represent inches, said large hand being connected to said gear train; and mounting means for mounting said housing to an exterior of a product storage tank, said mounting means being constructed so as to permit said housing to be swiveled with respect to said product storage tank so that said gauge can be conveniently positioned for ease of viewing wherein said mounting means comprises a spout end member extending from said housing; a swivel adapter mounted for relative movement with respect to said spout end member, said swivel adapter having an external threaded surface; and sealing means for forming an airtight connection between said spout end member and said swivel adapter.

* * * * *